United States Patent [19]
Sabel

[11] 3,855,029
[45] Dec. 17, 1974

[54] METHOD FOR RE-INFORCING CAST-METAL OBJECTS, PARTICULARLY THIN PLATES OF HARD AND BRITTLE CAST STEEL

[76] Inventor: Erik Arne Sabel, Box 128, S-940 20 Ojebyn, Sweden

[22] Filed: Mar. 14, 1973

[21] Appl. No.: 340,995

Related U.S. Application Data

[63] Continuation of Ser. No. 829,559, June 2, 1969, abandoned.

[30] Foreign Application Priority Data
Mar. 12, 1969 Sweden.............................. 3384/69

[52] U.S. Cl................... 156/92, 161/114, 161/123, 164/75, 264/257, 264/263, 264/274
[51] Int. Cl.............................................. B32b 7/00
[58] Field of Search .......... 264/257, 271, 274, 263; 156/92; 161/53, 114, 123; 164/75

[56] References Cited
UNITED STATES PATENTS

| | | | |
|---|---|---|---|
| 2,051,373 | 8/1936 | Fitzgerald | 156/92 |
| 3,279,048 | 10/1966 | Grove et al. | 264/257 X |
| 3,523,152 | 8/1970 | Curtis | 264/257 X |

FOREIGN PATENTS OR APPLICATIONS
913,528   12/1962   Great Britain...................... 156/92

Primary Examiner—Edward G. Whitby
Attorney, Agent, or Firm—Robert E. Burns; Emmanuel J. Lobato; Bruce L. Adams

[57] ABSTRACT

The invention relates to a novel method of reinforcing very thin and brittle plates, particularly steel plates, which have a hardness exceeding 400 Brinell. The object aimed at is obtained thereby that an armouring is anchored to the plate, on one side thereof, whereafter the armouring is covered with synthetic resin which is then cured.

3 Claims, 10 Drawing Figures

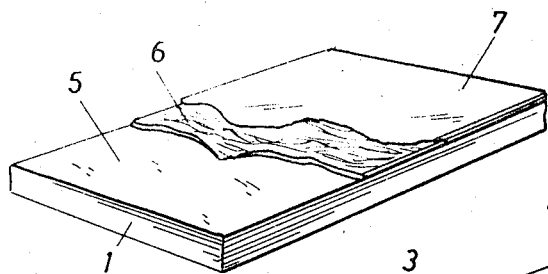
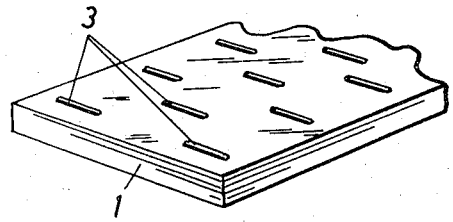
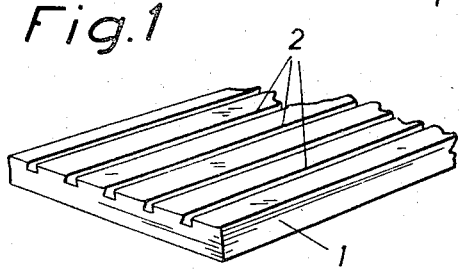
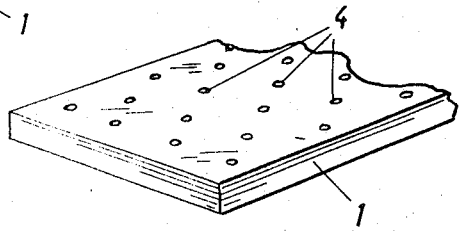
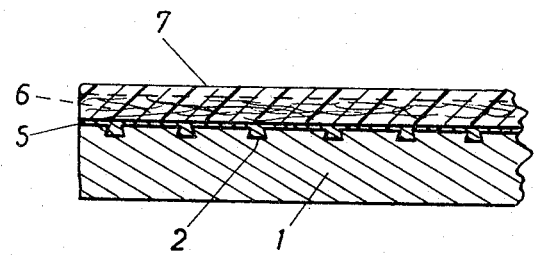
INVENTOR
ERIK ARNE SABEL

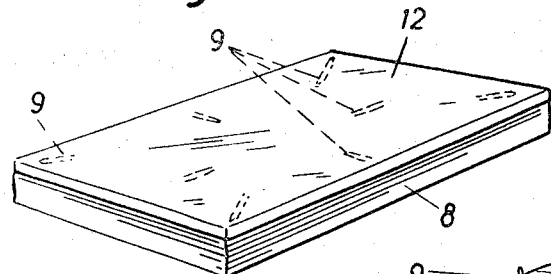
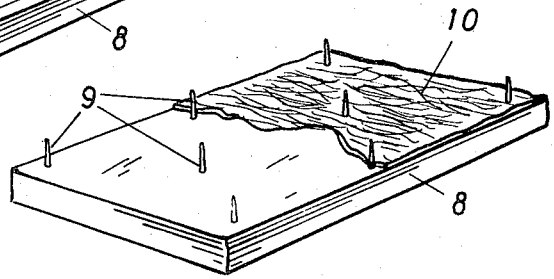
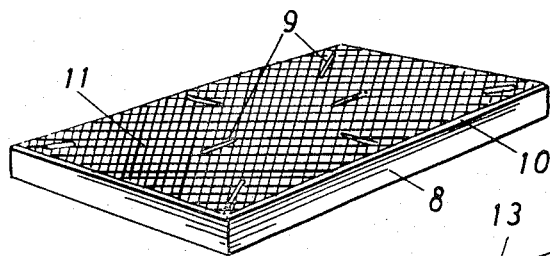
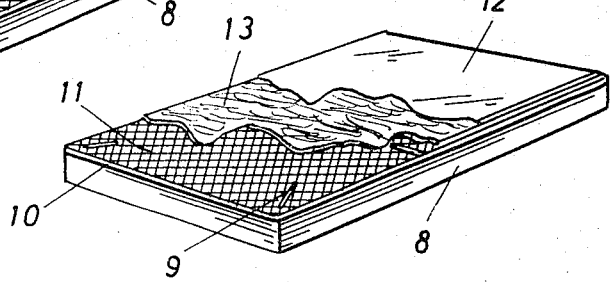
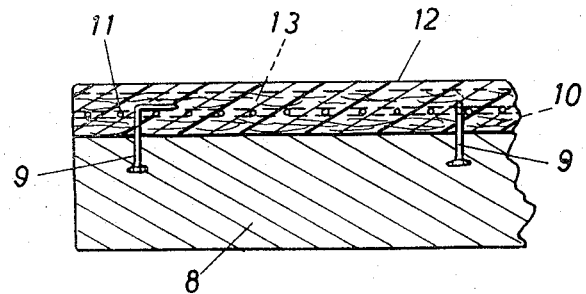

METHOD FOR RE-INFORCING CAST-METAL OBJECTS, PARTICULARLY THIN PLATES OF HARD AND BRITTLE CAST STEEL

This is a continuation of application Ser. No. 829,559, filed June 2, 1969, now abandoned.

It is already known to re-inforce hard and brittle cast-metal objects by imbedding armouring elements in the same. The armouring — are covered by a layer of a material — allows the armouring elements to move to some extent inside the cast metal objects in order to even out tension. This method cannot, however, be used with relatively thin plates or sheets since in such cases there will be no room for the armouring elements in the cast metal objects.

The purpose of the present invention is to make possible to re-inforce plates or similar thin objects of this kind - in the following referred to as plates, only - and in accordance with the invention this has been achieved by attaching an armouring element to the plate on one side of the latter and then cover the armouring element with synthetic resin which is subsequently cured (tempered).

The invention is primarily concerned with re-inforcing cast, brittle and relatively thin steel plates of the kind having a hardness exceeding 400 Brinell.

The armouring can be fastened to the plate in several various ways and in accordance with the invention is for instance suggested that cavities are molded into the plate during casting these cavities serving as attachment points for a bonding agent for anchoring the armouring, whereupon the armouring is arranged on this bonding agent and synthetic resin finally added which merges into and covers the underlying layers.

The anchoring can also be carried out by means of nails or the like secured to the plate by casting and the armouring is threaded on to these nails which are thereafter bent over the armouring in such a way that the armouring is retained in contact with the plate, whereupon a layer of synthetic resin is applied to cover the armouring.

The armouring can consist of a sheet of glass fibre, a steel wire net or of both, in combination.

The invention will be described more in detail in the following reference being had to the accompanying drawings. In the drawings:

FIGS. 1, 2 and 3 show different plates to be armoured in accordance with the invention, FIG. 4 shows a plate armoured in accordance with the invention, FIG. 5 is a section through an armoured plate, FIG. 6 shows a plate in accordance with a modified version of the armouring, FIG. 7 shows the same plate during one stage of the armouring operation, FIG. 8 illustrates the different armouring layers, FIG. 9 shows a finished, armoured plate, and FIG. 10 shows a section through a plate, armoured in accordance with the modified method.

In accordance with FIG. 1 a plate 1 to be armoured is formed with longitudinal grooves 2 during the casting operation, these grooves 2 preferably diverging outwards towards the bottom.

The plate 1 shown in FIG. 2 has been cast so that notches 3 have formed therein, these notches diverging outwards towards the bottom in the same way as the grooves 2.

The plate 1 shown in FIG. 3 is formed, during casting, with circular holes or recesses 4.

When carrying out the invention, the plate 1 is being covered with a layer 5 of a bonding agent such that the bonding agent layer penetrates down into the grooves 2, the notches 3 or the recesses 4, as the case may be, and after curing is bonded to the plate 1. Before the bonding layer 5 has set an armouring layer 6 is applied, such as for instance a glass fibre layer, and on top thereof is subsequently applied a layer 7 of synthetic resin which latter layer both covers the armouring and also penetrates down into the latter to cover the armouring and securely anchor it to the plate 1. Finally, the plate may be edge-trimmed in order to obtain the desired dimensions.

FIG. 6–10 show a modified version of the method in accordance with the invention wherein as shown in FIG. 6 the plate 8 to be armoured is formed during casting with nails 9 or the like projecting outwards from one face of the plate. The armouring which may consist of a glass fibre layer 10, a steel wire net 11, a metal foil having cut-out portions in the shape of stars or the like, or combinations of that kind of armours is thereafter threaded onto these nails 9. When the armouring has been brought in position and the nails 9 bent down over the armouring, a layer 12 of synthetic resin is applied as an outer coating. Between the armouring 11 and on the synthetic resin layer 12 could, if desired, be applied an additional layer 13 consisting of glass fibre. The plate is thereafter treated with heat to cure the synethetic resin coating and the plate is finally edge-trimmed.

The invention is not limited to the embodiments shown and described but several modifications are possible within the scope of the appended claims. It is for instance possible to carry out various different operations between the applications of the different layers, and in this connection could be mentioned cleaning of the surface of the plate to be armoured. This cleaning operation can be carried out with a steel brush or by means of sand blasting. Furthermore many different t synthetic resins, could be used, for example unsaturated polyester plastics or epoxy resins, although many other thermosetting resins are possible to use. It is also possible to use unmixed theremoplastic resins. As a vulcanizable binding agent between the plate and the armouring could, without limiting the use to this product, be mentioned the commercially available Epoxylime Araldit AV 106 or Silikanlime Silane DC Z–6040.

The invention provides a method for armouring thin cast metal objects and it should above all be pointed out that the invention has made possible the armouring of cast metal objects having a hardness exceeding 400 Brinell whereby brittle material of this kind is made useable in the shape of wear plates in fields where use of plates of this kind has hitherto caused great difficulties on account of the difficulty to armour them.

What we claim is:

1. A method of making re-inforced thin plates of brittle metal comprising the steps of: casting a thin plate of steel having a hardness in excess of 400 Brinnel and having recesses distributed on a major surface thereof for receiving anchors therein, bonding spaced-apart anchors in said recesses and disposed upstanding and projecting from said major surface of said plate, placing on said major surface of said plate a layer of net armouring with said anchors extending into said net armouring, anchoring said net armouring with said anchors, diffusing synthetic resin through said net armouring around said anchors and in contact with said major surface, and curing said synthetic resin to intimately bond said net armouring to said major surface of said plate and said anchors for reinforcing said steel plate.

2. A method according to claim 1, in which said net armouring comprises a layer of glass fibre.

3. A method according to claim 1, in which said net armouring comprises a metal wire net.

* * * * *